(12) United States Patent
Engel

(10) Patent No.: US 7,525,543 B2
(45) Date of Patent: Apr. 28, 2009

(54) HIGH PERFORMANCE SHADING OF LARGE VOLUMETRIC DATA USING SCREEN-SPACE PARTIAL DERIVATIVES

(75) Inventor: Klaus D. Engel, West Windsor, NJ (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 256 days.

(21) Appl. No.: 11/180,100

(22) Filed: Jul. 13, 2005

(65) Prior Publication Data

US 2006/0028469 A1    Feb. 9, 2006

Related U.S. Application Data

(60) Provisional application No. 60/600,428, filed on Aug. 9, 2004.

(51) Int. Cl.
| | | |
|---|---|---|
| G06T 15/00 | (2006.01) | |
| G06T 17/00 | (2006.01) | |
| G06T 15/40 | (2006.01) | |
| G06T 15/50 | (2006.01) | |
| G06T 15/60 | (2006.01) | |
| G06T 15/10 | (2006.01) | |
| G06T 15/20 | (2006.01) | |

(52) U.S. Cl. ................... 345/426; 345/419; 345/420; 345/421; 345/422; 345/424; 345/427

(58) Field of Classification Search ......... 345/419–427, 345/502–506
See application file for complete search history.

(56) References Cited

U.S. PATENT DOCUMENTS

| | | | | |
|---|---|---|---|---|
| 4,163,257 A | * | 7/1979 | White | 375/240.12 |
| 4,618,989 A | * | 10/1986 | Tsukune et al. | 382/203 |
| 4,737,921 A | * | 4/1988 | Goldwasser et al. | 345/421 |
| 4,745,550 A | * | 5/1988 | Witkin et al. | 702/11 |
| 4,827,413 A | * | 5/1989 | Baldwin et al. | 345/421 |
| 4,879,668 A | * | 11/1989 | Cline et al. | 345/424 |
| 5,185,809 A | * | 2/1993 | Kennedy et al. | 382/131 |
| 5,214,753 A | * | 5/1993 | Lee et al. | 345/610 |
| 5,371,778 A | * | 12/1994 | Yanof et al. | 378/4 |
| 5,377,313 A | * | 12/1994 | Scheibl | 345/422 |
| 5,412,563 A | * | 5/1995 | Cline et al. | 345/420 |
| 5,499,322 A | | 3/1996 | Thirion et al. | |
| 5,570,460 A | * | 10/1996 | Ramanujam | 345/424 |
| 5,594,842 A | * | 1/1997 | Kaufman et al. | 345/424 |
| 5,617,521 A | * | 4/1997 | Goto | 345/426 |
| 5,630,034 A | * | 5/1997 | Oikawa et al. | 345/424 |
| 5,719,600 A | * | 2/1998 | Alcorn | 345/587 |

(Continued)

OTHER PUBLICATIONS

Levoy, Marc; "Volume Rendering: Display of Surfaces from Volume Data;" May 1988; IEEE; pp. 29-37.*

(Continued)

*Primary Examiner*—Kee M Tung
*Assistant Examiner*—Crystal Murdoch
(74) *Attorney, Agent, or Firm*—Donald B. Paschburg

(57) ABSTRACT

A method and system for shading large volumetric data sets using partial derivatives computed in screen-space. The method and system provide a fast and efficient shading a large datasets. Screen space derivatives are computed efficiently by evaluating neighboring pixel information together. The method can be efficiently implemented using GPUs (graphics processing units) that provides some access to information about neighboring pixels using ddx and ddy fragment processing functions.

22 Claims, 7 Drawing Sheets

U.S. PATENT DOCUMENTS

| | | | | |
|---|---|---|---|---|
| 5,808,619 | A * | 9/1998 | Choi et al. | 345/426 |
| 5,953,015 | A * | 9/1999 | Choi | 345/428 |
| 6,005,583 | A * | 12/1999 | Morrison | 345/587 |
| 6,097,397 | A * | 8/2000 | Lee | 345/586 |
| 6,330,281 | B1 * | 12/2001 | Mann et al. | 375/240.12 |
| 6,421,057 | B1 * | 7/2002 | Lauer et al. | 345/506 |
| 6,532,017 | B1 * | 3/2003 | Knittel et al. | 345/506 |
| 6,556,199 | B1 * | 4/2003 | Fang et al. | 345/424 |
| 6,603,484 | B1 * | 8/2003 | Frisken et al. | 345/622 |
| 6,664,971 | B1 * | 12/2003 | Mukherjee et al. | 345/582 |
| 6,680,735 | B1 * | 1/2004 | Seiler et al. | 345/424 |
| 6,697,497 | B1 * | 2/2004 | Jensen et al. | 382/100 |
| 6,724,383 | B1 * | 4/2004 | Herken et al. | 345/420 |
| 6,782,432 | B1 * | 8/2004 | Nelson et al. | 710/1 |
| 6,825,851 | B1 * | 11/2004 | Leather | 345/426 |
| 6,833,830 | B2 * | 12/2004 | Collodi | 345/584 |
| 2001/0020948 | A1 * | 9/2001 | Piazza et al. | 345/586 |
| 2002/0005850 | A1 * | 1/2002 | Osborne et al. | 345/424 |
| 2002/0113787 | A1 * | 8/2002 | Ray et al. | 345/424 |
| 2002/0190988 | A1 | 12/2002 | Maillot et al. | |
| 2003/0198404 | A1 * | 10/2003 | Frisken et al. | 382/285 |
| 2003/0223615 | A1 * | 12/2003 | Keaton et al. | 382/100 |
| 2004/0012563 | A1 * | 1/2004 | Papakipos et al. | 345/157 |
| 2004/0066385 | A1 * | 4/2004 | Kilgard et al. | 345/506 |
| 2004/0151356 | A1 * | 8/2004 | Li et al. | 382/131 |
| 2004/0153128 | A1 * | 8/2004 | Suresh et al. | 607/14 |
| 2004/0161141 | A1 * | 8/2004 | Dewaele | 382/132 |
| 2004/0179010 | A1 * | 9/2004 | Wittenbrink et al. | 345/440 |
| 2005/0036689 | A1 * | 2/2005 | Mahdavieh | 382/199 |
| 2005/0041842 | A1 * | 2/2005 | Frakes et al. | 382/128 |
| 2005/0043619 | A1 * | 2/2005 | Sumanaweera et al. | 600/437 |
| 2005/0105829 | A1 * | 5/2005 | Cathier | 382/296 |
| 2005/0259103 | A1 * | 11/2005 | Kilgard et al. | 345/506 |
| 2006/0087509 | A1 * | 4/2006 | Ebert et al. | 345/473 |

OTHER PUBLICATIONS

Ke, Hao-Ren et al.; "Ray-Cast Volume Rendering Accelerated by Incremental Trilinear Interpolation and Cell Templates;" 1995; The Visual Computer; vol. 11; pp. 297-308.*

Morse, Bryan S.; "Lecture 13: Edge Detection;" Feb. 12, 2000; Brigham Young University; pp. 1-6.*

Weiskopt, Daniel; "Basics of GPU-Based Programming;" 2003; IEEE Visualization Tutorial; Interactive Visualization of Volumetric Data on Consumer PC Hardware; pp. 1-12.*

Kindlmann; Gordon et al.; "Curvature-Based Transfer Functions for Direct Volume Rendering: Methods and Applications;" Oct. 19-24, 2003; IEEE Visualization; Proceedings of the 14th IEEE Visualization Conference; pp. 513-520.*

Walter, Bruce et al.; "Interactive Rendering using the Render Cache;" 1999; pp. 1-13.*

Crawford, C.R. et al.; "3-D Imaging Using Normalized Gradient Shading;" 1988; IEEE Engineering in Medicine and Biology Society 10th Annual International Conference; pp. 1-2.*

Cabral, Brian, et al., "Acclerated Volume Rendering and Tomographic Reconstruction Using Texture Mapping Hardware", *ACM Symposium on Volume Visualization*, (1994), 91-98.

Levoy, Marc, "A Hybrid Ray Tracer for Rendering Polygon and Volume Data", *IEEE Computer Graphics and Applications*, (Mar. 1990),33-40.

Levoy, Marc, "Efficient Ray Tracing of Volume Data", *ACM Transactions on Graphics*, (Jul. 1990),9(3):245-261.

Max, Nelson, "Optical Models for Direct Volume Rendering", *IEEE Transactions on Visualization and Computer Graphics*, (1995),99-108.

Meiβner, Michael, et al., "A Practical Evaluation of Popular Volume Rendering Algorithms", *Proceedings of the 2000 IEEE symposium on Volume visualization*, (2000),81-90.

Nvidia Web Page, "Cg", http://developer.nvidia.com/page/cg_main.html, 2005.

Nvidia Web Page, "Introduction—NVIDIA 'CineFX' Architecture", http://developer.nividia.com/attach/7052, Aug. 5, 2002.

Rezk-Salama, C., et al., "Interactive Volume Rendering on Standard PC Graphics Hardware Using Multi-Textures and Multi-Stage Rasterization", *SIGGRAPH/EUROGRAPHICS Workshop On Graphics Hardware*, (2000),109-118, 147.

Westermann, Rüdiger, et al., "Efficiently Using Graphics Hardware in Volume Rendering", *Proceedings of the 25th annual conference on Computer graphics and interactive techniques*, (1998),169-177.

T. Jirka, V. Skala: Gradient Vector Estimation and Vertex Normal Computation, Univ. of West Bohemia Pilsen, Oct. 2002, Technical Report No. DCSE/TR-2002-08, Title Page, List of contents and pp. 1-27; eHB.

Iso-Contour Volume Rendering, James Arvo, Kevin Novins 1994.

W.D. Fellner, Computergrafik 1992.

* cited by examiner

HIGH PERFORMANCE SHADING OF LARGE VOLUMETRIC DATA USING SCREEN-SPACE PARTIAL DERIVATIVES

CROSS-REFERENCE TO RELATED APPLICATIONS

This application claims the benefit of U.S. Provisional Application No. 60/600,428, filed Aug. 9, 2004, which is incorporated herein by reference.

BACKGROUND OF THE INVENTION

Techniques for rendering volumetric data sets are known in the art. These techniques have been described in detail. See, for example, Marc Levoy, *A Hybrid Ray Tracer for Rendering Polygon and Volume Data*, IEEE Computer Graphics and Applications, pages 33-40, March 1990; and Marc Levoy, *Efficient Ray Tracing of Volume Data*, ACM Transactions on Graphics, 9(3):245-261, July 1990, both of which are incorporated herein by reference.

Fast rendering of volumetric data sets using the texturing capabilities of graphics hardware has also been described in detail. See, for example, B. Cabral, N. Cam and J. Foran, "Accelerated Volume Rendering and Tomographic Reconstruction Using Texture Mapping Hardware", ACM Symposium on Volume Visualization, 1994; C. Rezk-Salama, K. Engel, M. Bauer, G. Greiner, T. Ertl, "Interactive Volume Rendering on Standard PC Graphics Hardware Using Multi-Textures and Multi-Stage Rasterization", In Euographics/SIGGRAPH Workshop on Graphics Hardware, 2000, pages 109-118, 147, Addison-Wesley Publishing Company, Inc., 2000, which are incorporated by reference. Shading models for volumetric data are also discussed in N. Max, "Optical Models for Direct Volume Rendering", IEEE Transactions on Visualization and Computer Graphics 1995, pages 99-108, which is incorporated herein by reference.

Shading is a well-known technique to enhance depth-perception and accentuate details contained within the data that can be performed in real-time. Shading volumetric data requires gradient information for each voxel. Gradients can either be pre-computed and stored along with the volume data or computed on-the-fly. Pre-computing gradients significantly increases the amount of memory required, thereby making this approach impractical for large volume data sets. Clinical routines currently generate data sets exceeding half a gigabyte, and the amount of information being acquired is increasing rapidly. New systems are capable of generating data sets that are more than a gigabyte in size. Furthermore, gradients are typically quantized to either 8 or 16-bits to constrain the amount of memory required, which decreases the quality of the volumetric renderings. On the other hand, although computing gradients on-the-fly provides better quality, and neither requires pre-processing nor imposes any significant additional memory demands, it suffers from significantly slower performance. This reduction in performance is due to the additional computations and memory accesses during rendering; for example, a forward difference gradient requires accessing three neighboring voxels, while a central difference gradient requires accessing six neighboring voxels.

It is therefore desirable to provide methods and systems that perform faster on-the-fly gradient estimation for shaded rendering of volumetric data.

SUMMARY OF THE INVENTION

This invention provides a fast method to enhance image quality in texture-based volume rendering by shading large volumes without pre-computing gradient information. Gradients are computed in screen-space, instead of in object-space, to reduce the overhead of acquiring neighboring data by computing multiple pixels at a time. This invention is well-suited for modem GPUs (graphics processing units), as they process multiple pixels at a time (e.g., a 2×2 pixel "quad").

In accordance with one aspect of the present invention, a shading method for rendering volumetric data is provided. The method includes the steps of determining a partial derivative with respect to the x component of a screen coordinate of a pixel, determining a partial derivative with respect to a y component of the screen coordinate of the pixel, and determining a gradient from the partial derivatives in screen-space. In accordance with another aspect of the present invention, the method includes the step of using the gradient to determine a shading characteristic of the pixel based on the gradient.

In accordance with a further aspect of the present invention, the method includes performing the steps of determining the partial derivatives in a graphics processing unit. In accordance with a preferred embodiment, the partial derivatives are calculated using a fragment function ddx in the graphics processing unit and a fragment function ddy in the graphics processing unit.

In accordance with a further aspect of the present invention, the method of rendering volumetric data is applicable on a variety of imaging systems. In accordance with these aspects, systems of the present invention include an imaging device, a processor and a display.

In accordance with another aspect of the present invention, a method of rendering volumetric data includes the following steps: obtaining a sample of data from a volume; classifying the sample; computing a screen-space gradient; normalizing the screen-space gradient; computing diffuse and specular components; and computing output colors. The results obtained from these steps are eventually displayed.

DESCRIPTION OF A PREFERRED EMBODIMENT

Data Acquisition.

Figure 1:
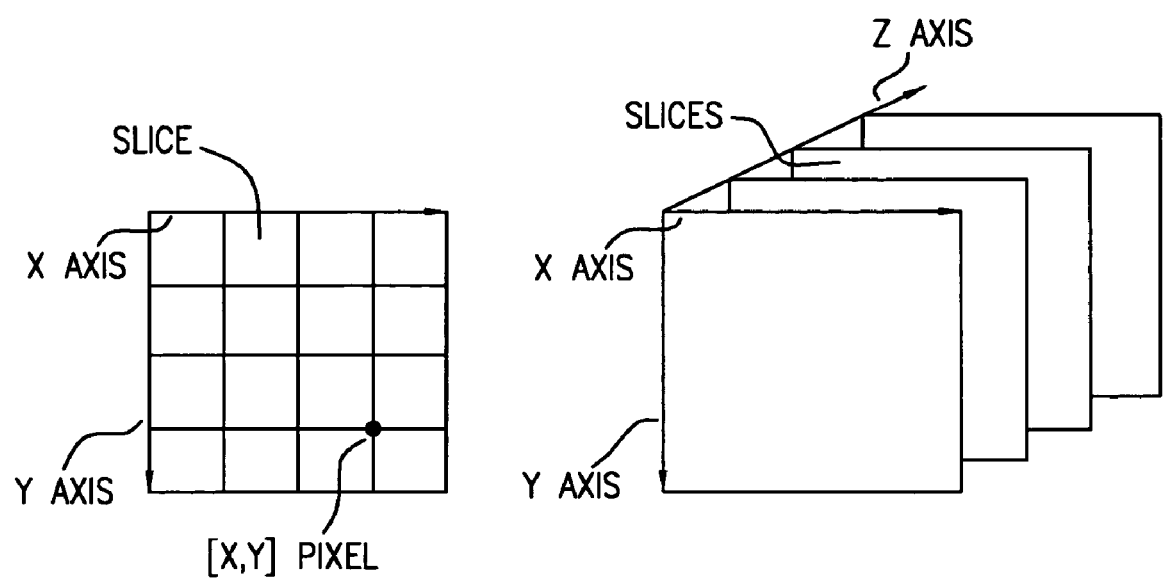
FIGS. 1 and 2 illustrate fundamental data structures used in one aspect of the present invention.

The data processed by this invention is a three-dimensional array of data. Referring to FIG. 1, the data consists of a sequence of adjacent "images," where each image is a two-dimensional image array of data points. Each grid value of a two-dimensional image array is called a picture element, or "pixel." A series of such images may be arranged in sequential order, and each two-dimensional image is termed a SLICE. Thus, a volume is formed from a plurality of slices.

When performing full body scans with a magnetic imaging machine, it is common to generate approximately 3000 slices of data. These slices may be approximately 0.4 mm apart.

Figure 2:
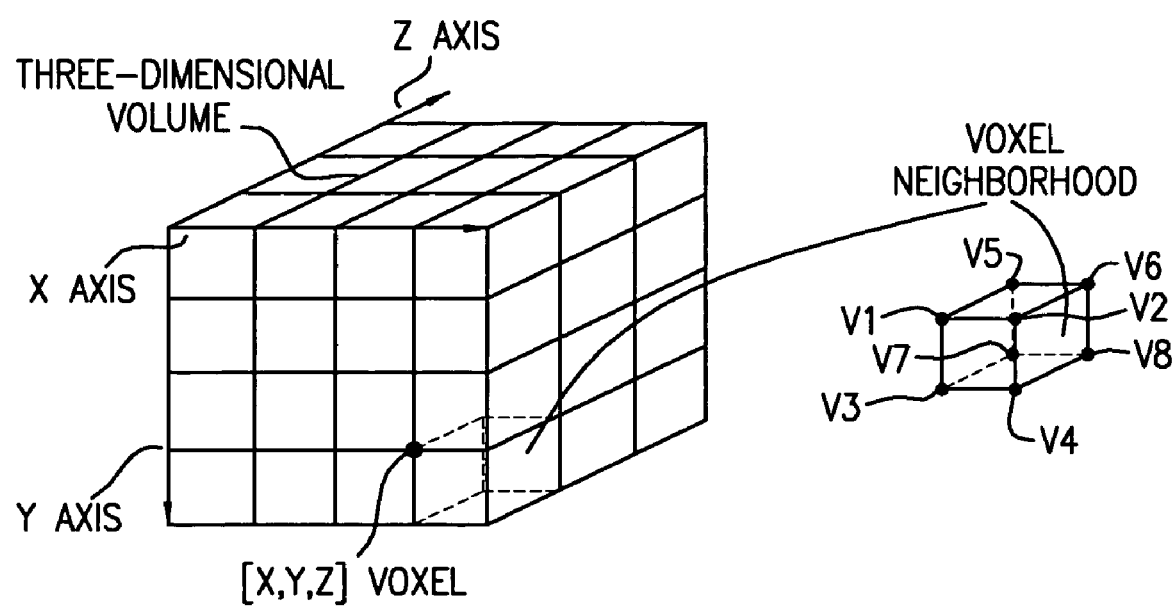

Referring to FIG. 2, each grid value of a three-dimensional volume array is called a volume element, or "voxel." A voxel has a voxel neighborhood. The voxel neighborhood includes the corner points of a cube, which are designated V1, V2, V3, V4, V5, V6, V7 and V8.

Figure 5:
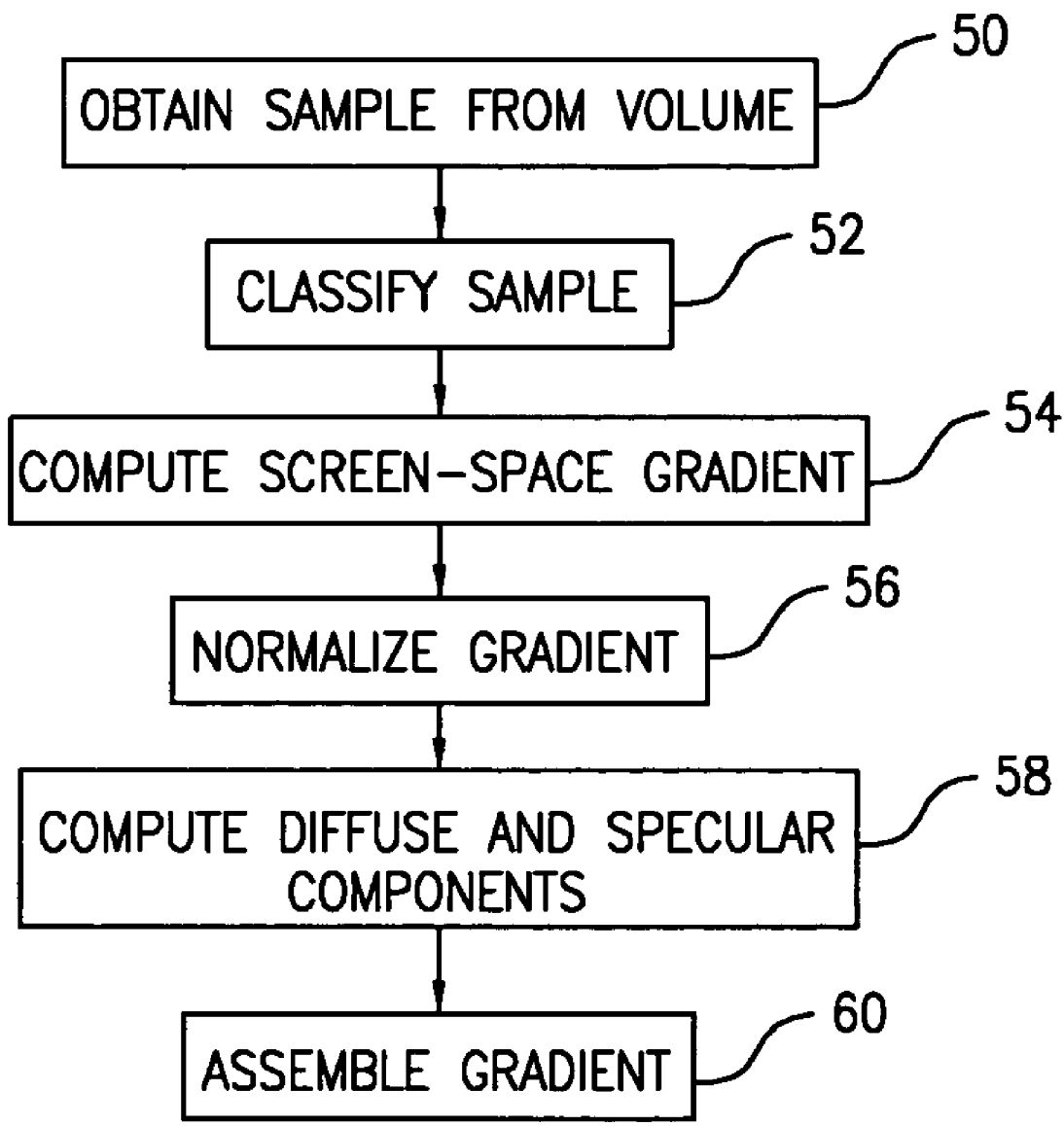
FIG. 5 is a flow chart of a generalized fragment program in accordance with one aspect of the present invention and FIG. 6 is a flow chart of the gradient determination process.

The acquisition of this type of data is well known in the art and is produced by systems such as Magnetic Resonance (MR) imaging systems, Computed Tomography (CT) scanning systems, Positron Emission Tomography (PET), and Ultrasound scanning. Such imaging systems 70 are shown in FIG. 5. Each of these systems produce different data that is associated with a voxel. For example, a Magnetic Resonance imaging system produces a scalar value for each voxel that indicates the water content. A Computed Tomography system produces a scalar value for each voxel that indicates how much x-ray was absorbed. An Ultrasound system produces a scalar value for each voxel that indicates how much sound was absorbed.

Image Synthesis from Volumetric Data.

Methods to generate a two-dimensional image from volumetric data can roughly be classified into indirect and direct volume rendering techniques. Indirect methods generate and render an intermediate representation of the volume data, while direct methods display the voxel data by evaluating an optical model that describes how the volume emits, reflects, scatters, absorbs and occludes light. See, for example, N. Max, "Optical Models for Direct Volume Rendering", IEEE Transactions on Visualization and Computer Graphics 1995, pages 99-108.

The voxel values are mapped to physical quantities describing light interaction at the respective points in 3 D-space. During image synthesis the light propagation is computed by integrating light interaction effects along viewing rays based on the optical model. The corresponding integral is known as the volume rendering integral.

The data in a slice as shown in FIG. 1 is in "object-space." When creating images from the data, it is necessary to construct views at various angles. This requires constructing datasets from the data in object-space along different angles, such as along the polygon slices illustrated in FIG. 3. The data in the polygon slices will include data from a number of slices in the object-space, and the data in the polygon slices as that data is projected onto a computer screen is in the "screen-space." Methods to convert datasets from object-space to screen-space are well known, as are the terms object-space and screen-space.

Shading of Volumetric Data.

Shading provides visual cues to aid in the visualization and interpretation of volumetric data. Shading can accentuate small-scale surface structures and texture (roughness), as well as additional depth cues. Shading takes into account the effect of external light sources by computing the interaction of light at each point where it illuminates the surface, taking into consideration the properties of the surface at each point illuminated by a ray. The properties consist of material properties such as color, opacity and shininess, as well as the local shape of the surface.

The most computationally expensive part of the shading equation is computing the local shape, which is typically represented by the local gradient. The most frequently used techniques for computing gradients for a volume are the forward and central differences methods. See, for example, Abramowitz, M. and Stegun, I. A. (Eds.), Handbook of Mathematical Functions with Formulas, Graphs, and Mathematical Tables, 9th printing, New York: Dover, p. 877, 1972, which is incorporated herein by reference. Previously, gradients were computed on object-space data. Also, these gradients are frequently computed in a pre-processing step and stored in an adjunct volume or combined with the source data in another volume. However, the additional memory required to store gradient information makes this approach ill-suited for large volume data. Consequently, gradients are computed on-the-fly during rendering. On-the-fly computation of gradient information requires evaluating the neighborhood of each voxel being rendered, which for a forward difference involves evaluating three neighbors, while a central difference involves evaluating six neighbors. The present invention reduces the cost of accessing and evaluating neighboring information, and therefore considerably increases performance.

In one embodiment of the present invention, the computation of the gradient information can be moved from a central processing unit (CPU) to a fragment program on graphics processing unit (GPU). There are a few advantages to this approach. First, the GPU can typically perform such vector operations faster than a CPU—GPUs are single instruction multiple data (SIMD) parallel processors. Second, the effective cost of the gradient computation is reduced due to the GPU pipeline, where the same fragment program is typically executed in on neighboring pixels in parallel by multiple pixel pipelines. That is, one fragment pipline do not impose any additional delay because it executes in parallel with, and independent of, other fragment pipelines. Third, moving the computation to a fragment program can reduce the amount of data transferred from the CPU to the GPU via the relatively slow AGP (Accelerated Graphics Port) or PCI Express (data is transferred using AGP or the newer PCI Express interface from main memory into local GPU memory or vice versa).

Screen-Space Partial Derivatives.

This invention uses partial derivatives computed in screen-space for the gradients used in shading calculations. This approach requires access to information for rays traversing neighboring pixels having the same depth with respect to the camera; that is, a scalar physical property p (such as density) of the volume at pixels with the same depth as the ray at the current pixel position has to be evaluated. In fact, any method for computing screen-space partial derivatives (such as forward differences, central differences, a Sobel operator, etc.) can be employed; however, in the following, the focus is on forward differences. In particular, in addition to the value of the current pixel at the screen-space position (x, y), denoted by p(x, y) with a given depth with respect to the camera, a forward difference gradient requires the values of the pixels to the right (p(x+1, y)) and above (p(x, y+1)) the current pixel. A 2 D forward difference screen-space gradient is then computed as:

$$\nabla p = \begin{pmatrix} p(x+1, y) - p(x, y) \\ p(x, y+1) - p(x, y) \end{pmatrix}.$$

As discussed in more detail below, the present invention's use of finding the gradient in screen-space is particularly well-suited for GPUs. However, it should be clear that significant speed increases can be found without necessarily requiring a GPU. For example, certain volumetric rendering algorithms involve casting groups of rays in neighboring pixel locations through the volume in parallel. During the computation, the volume densities (i.e., the scalar parameter p(x, y)) of these neighboring rays may be cached in registers, and hence fetching the densities can be quickly performed for the gradient calculations.

In order to produce a 3 D vector, a third component is required. This component may be, for example, an arbitrary constant, a forward difference computed in object-space along the ray direction, or a central difference computed in object-space along the ray direction. The most computationally efficient approach is to use a constant (whose value is proportional to brightness), while higher-quality results can be obtained from object-space central or forward differences.

Finally, it has been determined that the third component may be computed as a value that is proportional to the brightness and that is scaled according to the zoom value used to view the volumetric data. This has the benefit of assuring that the apparent brightness remains constant, regardless of the zoom value, since at higher and higher zoom values rays through neighboring pixels in screen space get ever closer in object space. Thus the offsets for the lookups of neighbors in screen space get smaller with higher zoom factors. A constant for the third component (the object-space partial derivative) tends to become relatively greater with respect to the first and second components (the screen-space partial derivatives), resulting in a brightness that appears to increase with the zoom. Thus compensation factors are introduced which scale each screen-space partial derivatives with a constant that is dependent on the zoom-factor. These constants are computed by projecting the distance between the samples used for the object-space partial derivative into screen-space and determining the number of pixels covered by this distance along the screen-space x- and y-directions.

Figure 4:
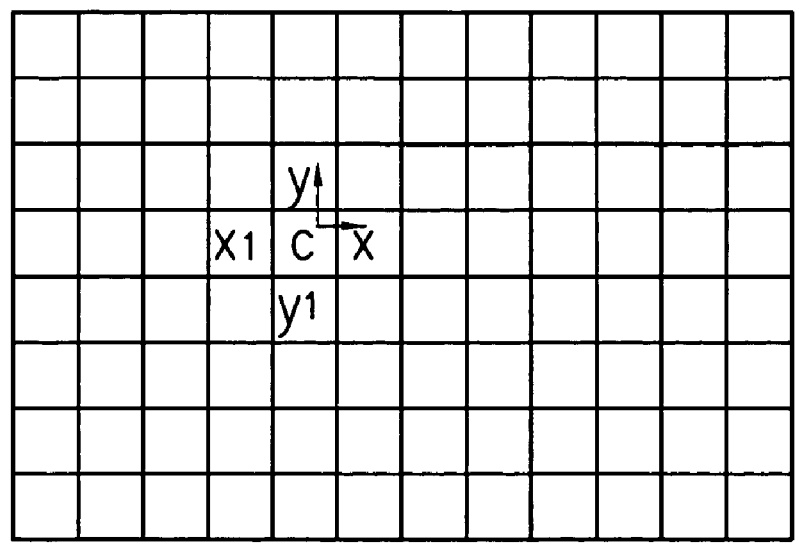
FIG. 4 illustrates the determination of partial derivatives or differences in accordance with one aspect of the present invention.
Figure 4:
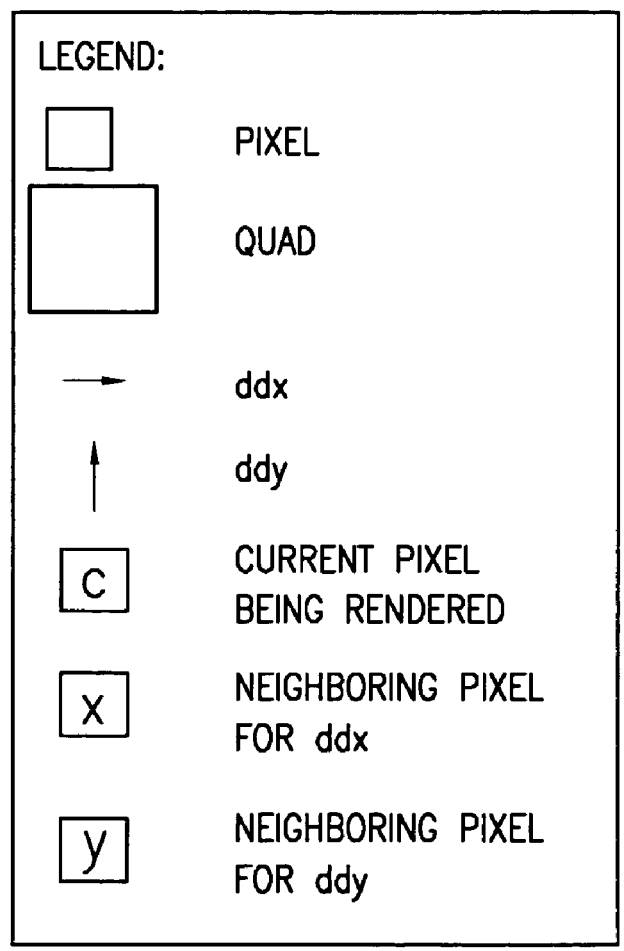

FIG. 4 illustrates step of determining a partial derivative in accordance with one aspect of the present invention. Each pixel in FIG. 4 is in the screen-space. Thus, each pixel is determined from a polygon slice as that data is projected onto a computer screen If C is the current pixel being operated on, and if a forward differences method is used, then the partial derivative in the x direction is determined by the difference between the scalar value associated with pixel X and the scalar value associated with pixel C. Also, the partial derivative in the y direction is determined by the difference between the scalar value associated with pixel Y and the scalar value associated with pixel C. Since a nVidia graphics processor includes all data in a Quad illustrated in FIG. 4, the use of the forward differences method is preferred when using a nVidia graphics processor to determine partial derivatives.

If a central differences method is used, then the partial derivative in the x direction is determined by the difference between the scalar value associated with pixel X and the scalar value associated with pixel X1. Also, the partial derivative in the y direction is determined by the difference between the scalar value associated with pixel Y and the scalar value associated with pixel Y1. As can be seen, this requires access to values outside a Quad, and therefore cannot be used on the nVidia graphics processor.

As previously discussed, the partial derivative in the z direction is preferably determined using object-space data.

As an example, the following C code provides a utility function to compute compensation factor to make shading independent on zoom-factor. The code takes as an input distance between samples along viewing direction and outputs scaling factors for screen-space partial derivatives:

```
void projectVoxelToScreenSpace(
            GLfloat dist,        // input
            GLfloat &xfactor,    // output1
            GLfloat &yfactor)    // output2
{
    GLint params[4];
    glGetIntegerv(GL_VIEWPORT,params);
    GLfloat mv[16];
    glGetFloatv(GL_MODELVIEW_MATRIX,mv);
    GLfloat proj[16];
    glGetFloatv(GL_PROJECTION_MATRIX,proj);
    GLfloat modlviewproj[16];
    matmul(modlviewproj, proj, mv);
        // define a cube with size dist
    GLfloat minX = -dist / 2.f;
    GLfloat maxX = dist / 2.f;
    GLfloat minY = -dist / 2.f;
    GLfloat maxY = dist / 2.f;
    GLfloat minZ = -dist / 2.f;
    GLfloat maxZ = dist / 2.f;
    // project all vertices of the cube to screen space
    GLfloat in[4];
    GLfloat out[8][4];
    in[0] = minX;in[1] = minY;in[2] = minZ;in[3] = 1;
    transform_point(out[0], modlviewproj, in);
    in[0] = maxX;in[1] = minY;in[2] = minZ;in[3] = 1;
    transform_point(out[1], modlviewproj, in);
    in[0] = minX;in[1] = maxY;in[2] = minZ;in[3] = 1;
    transform_point(out[2], modlviewproj, in);
    in[0] = maxX;in[1] = maxY;in[2] = minZ;in[3] = 1;
    transform_point(out[3], modlviewproj, in);
    in[0] = minX;in[1] = minY;in[2] = maxZ;in[3] = 1;
    transform_point(out[4], modlviewproj, in);
    in[0] = maxX;in[1] = minY;in[2] = maxZ;in[3] = 1;
    transform_point(out[5], modlviewproj, in);
    in[0] = minX;in[1] = maxY;in[2] = maxZ;in[3] = 1;
    transform_point(out[6], modlviewproj, in);
    in[0] = maxX;in[1] = maxY;in[2] = maxZ;in[3] = 1;
    transform_point(out[7], modlviewproj, in);
    int i;
    // homogeneous divide
    for (i=0;i<8;i++)
    {
        out[i][0] = out[i][0] / out[i][3];
        out[i][1] = out[i][1] / out[i][3];
        out[i][2] = out[i][2] / out[i][3];
        out[i][3] = 1.;
    }
    // transform vertices to device coordinates
    out[0][0] = (out[0][0]+1.f) * params[2]/2.f +
                                    params[0];
    out[0][1] = (out[0][1]+1.f) * params[3]/2.f +
                                    params[1];
    // find maximum and minimum coordinates in x and y
    float xMin = out[0][0];
    float xMax = out[0][0];
    float yMin = out[0][1];
    float yMax = out[0][1];
    for (i=1;i<8;i++)
    {
        out[i][0] = (out[i][0]+1.f) * params[2]/2.f +
                                        params[0];
        out[i][1] = (out[i][1]+1.f) * params[3]/2.f +
                                        params[1];
        if (out[i][0] > xMax)
            xMax = out[i][0];
        if (out[i][0] < xMin)
            xMin = out[i][0];
        if (out[i][1] > yMax)
            yMax = out[i][1];
        if (out[i][1] < yMin)
            yMin = out[i][1];
    }
    // return size of voxel in x and y
    xfactor = xMax-xMin;
    yfactor = yMax-yMin;
}
```

GPU-Based Screen-Space Derivative Shading.

Figure 3:
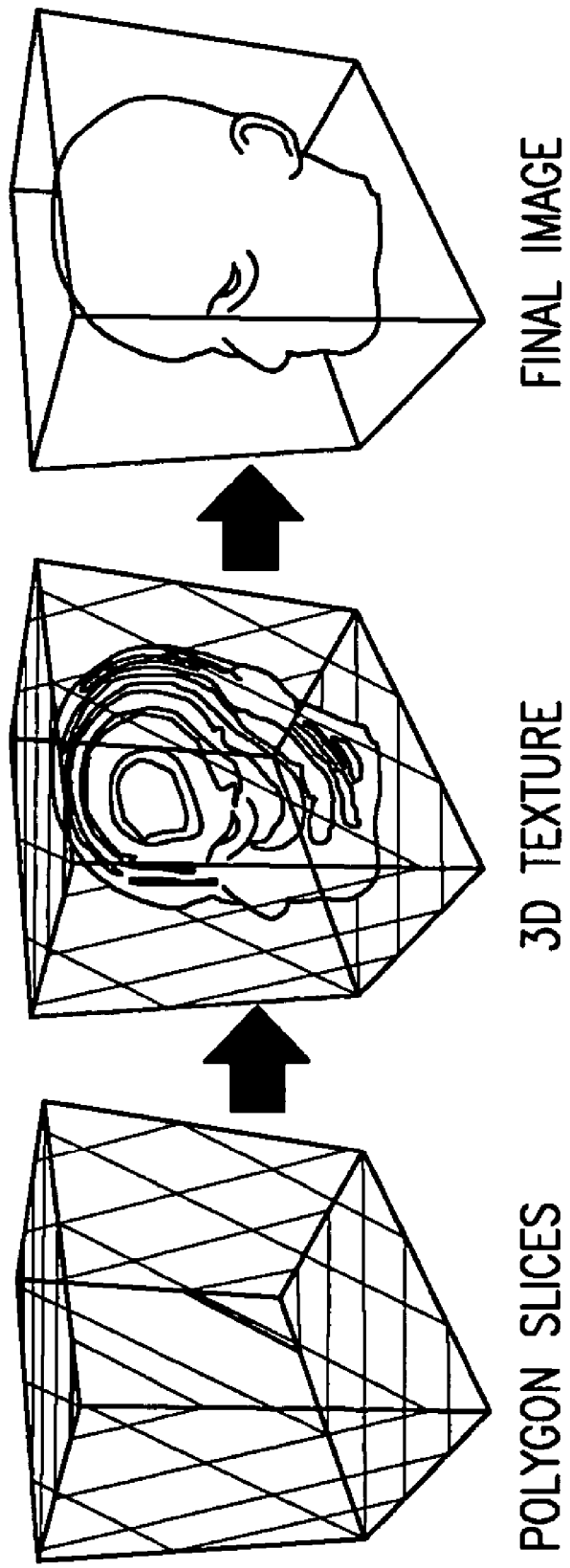
FIG. 3 illustrates volume rendering using 3D textures in accordance with one aspect of the present invention.

In FIG. 3, a series of view-aligned polygons are textured with oblique slices of the volume data and blended to obtain the final image. The 3D texture slicing method (see B. Cabral, N. Cam and J. Foran, "Accelerated Volume Rendering and Tomographic Reconstruction Using Texture Mapping Hardware", ACM Symposium on Volume Visualization, 1994, included herein by reference) is equivalent to tracing rays through all pixels of the screen in parallel through the volume. That is, each slice corresponds to an integration step for all rays at the same depth and each integration step is along the viewing direction by an amount corresponding to the sampling distance.

nVIDIA's CineFX architecture facilitates the fragment functions ddx and ddy to approximate the partial derivatives of a scalar value with respect to screen-space coordinates. Specifically, ddx(a) approximates the partial derivative of a with respect to the x-component of the screen coordinate, while ddy(a) approximates the partial derivative of a with respect to the y-component of the screen coordinate. These partial derivatives are computed very efficiently by the graphics hardware because several neighboring pixels are processed in parallel. The values of rays at neighboring positions are cached internally so that it is more efficient than accessing them using conventional direct texture access. Screen-space partial derivatives can exploit architectural features of GPUs.

By applying the ddx and ddy functions to the values obtained from sampling the volume at neighboring pixels, one can obtain information about the change of data values inside the volume in screen-space. This gradient information can be used for the Blinn-Phong shading model to evaluate the local illumination. Referring to FIG. 5, which depicts a flow chart for a program for screen-space derivative shading on a GPU according to the present invention. This flow chart is essentially the same as that used in conventional shading, except for the manner in which gradients are computed in the third step 54.

The first step 50 obtains a texel value from the 3 D texture representing the volume using the current texture coordinate (which is an input to the fragment program) as the index to the 3 D texture. Tri-linear interpolation is automatically performed by the hardware during this step.

Classification is performed in the second step 52. In accordance with one aspect of the present invention, classification is performed using a dependent texture lookup with the texel value as the index to the transfer function.

In the third step 54, a gradient is determined in the screen-space. This means that neighboring density information is determined dependent on x- and y-coordinates of the current pixel, rather than the x-, y- and z-coordinates of the current sampling position inside the volume. As previously mentioned, the gradient can be calculated in different ways. In accordance with one aspect of the present invention, the gradient can be calculated by determining a partial derivative in a screen-space with respect to a plurality of pixels in screen space, each having different screen coordinates. Then a gradient is determined from the partial derivatives. The number of pixels used depends on the method used to calculate the gradient, ie whether a forward difference method or another method is used.

In accordance with one aspect of the present invention, the gradient is determined by determining the partial derivative of a first pixel having a first screen coordinate and by determining a partial derivative in the screen-space with respect to a second pixel having a second screen coordinate. The gradient is then determined based on the results. Once again, the number of pixels used is dependent on the method used to calculate the gradient.

In accordance with a further aspect of the present invention, the step of determining the partial derivative with respect to a pixel includes the steps of determining a partial derivative with respect to a x-coordinate of the pixel and determining a partial derivative with respect to a y-coordinate of the pixel. Once again, the number of pixels used to determine the partial derivative is dependent on the method used to calculate the gradient.

In accordance with another aspect of the present invention, the partial derivative of the x-component of a pixel is obtained using the ddx function with the texel obtained from the first step. The partial derivative of the y-component of the gradient is obtained using the ddy function. The z-component of the gradient can be a constant, the object-space derivative in the z direction using the difference between the texel obtained from the first step and a second texel value obtained from a second texture coordinate, or a value scaled according to the zoom.

Figure 6:
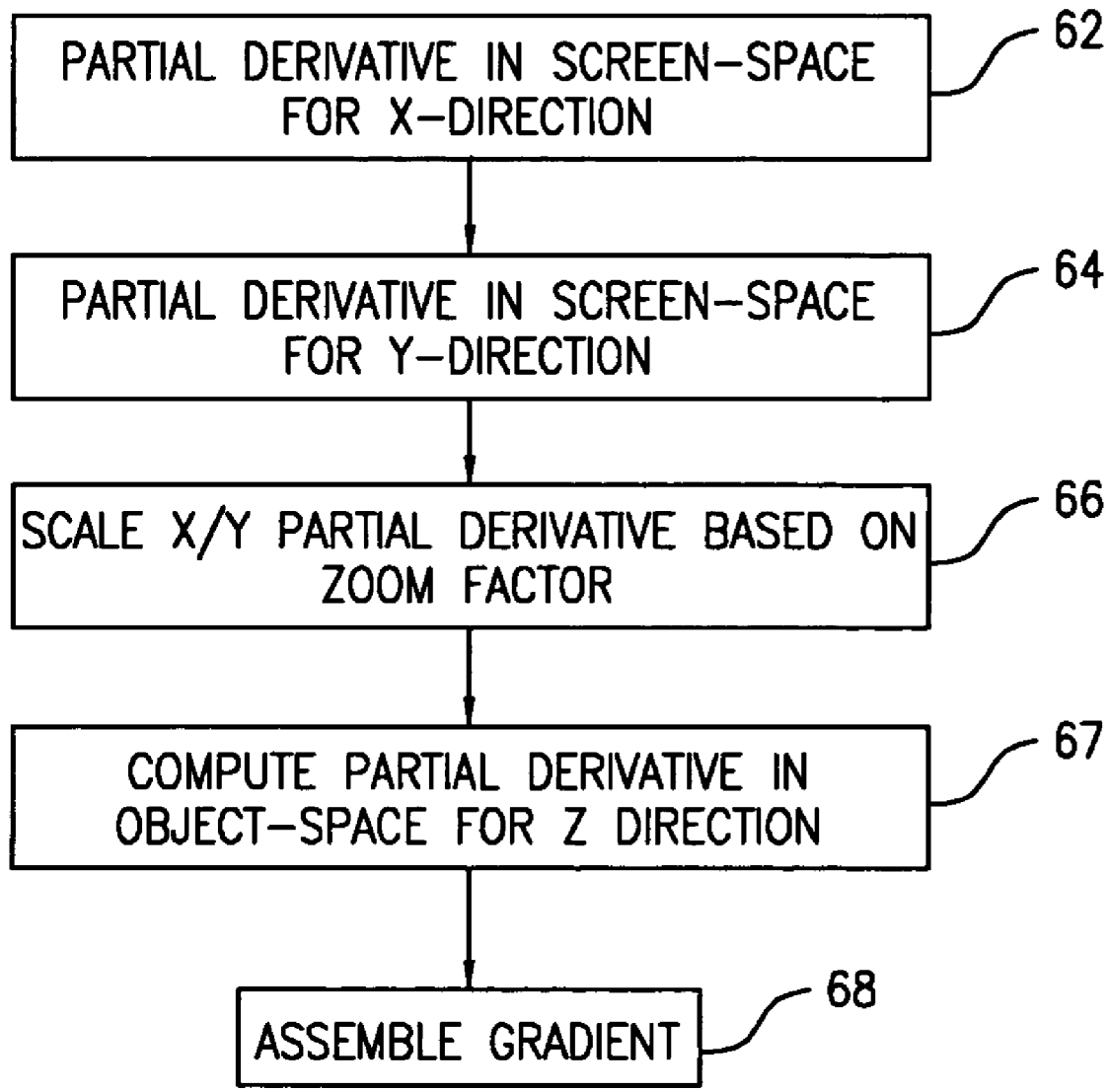

Thus, as illustrated in FIG. 6, the step of determining a gradient in accordance with one aspect of the present invention involves determining a partial derivative in screen-space for the x-direction in step 62, determining a partial derivative in screen-space for the y-direction in step 64, scaling the x/y partial derivatives based on a zoom value in step 66, computing the partial derivative in object-space for the z direction in step 67, and assembling the gradient in step 68. The scaling is described in greater detail hereinafter.

The gradient is normalized in the fourth step 56. The gradient is then used in the fifth step 58 to compute the diffuse and specular components. Finally, the output color is computed in step 60 using the classified color (from step 52), diffuse and specular parameters (from step 58) and material parameters (which are passed into the fragment program as constants).

This process is repeated for each sampling position in a dataset to render volumetric data. For example, shading characteristics can be determined using this process.

The present invention is not limited to merely the specular and diffuse components of shading. Screen-based partial derivatives can be used for other types of shading as well, such as opacity gradient modulation, where the opacity (alpha component) is modulated by the magnitude of the gradient to focus on the edges within the volume.

Figure 7:
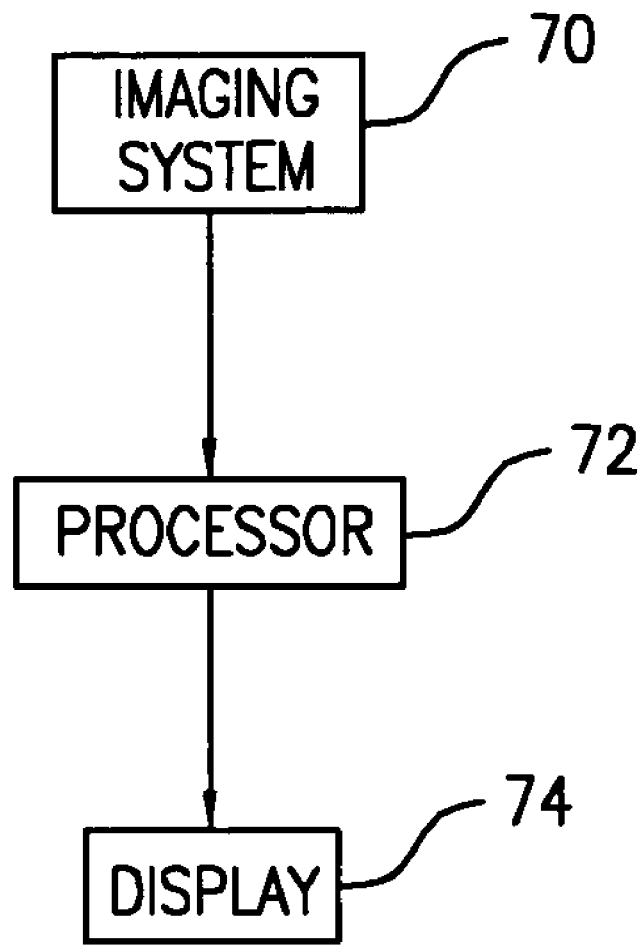
FIG. 7 illustrates an imaging system in accordance with one aspect of the present invention.

Referring to FIG. 7, a block diagram of a system using the present invention is shown. The system includes an imaging system 70, a processor 72 and a display 74. The imaging system can be any type of medical imaging system, including without limitation, Magnetic Resonance (MR) imaging systems, Computed Tomography (CT) scanning systems, Positron Emission Tomography (PET) systems, and ultrasound scanning systems. The processors 72 and the display 74 for these systems are well known. The present invention is preferably implemented in the processor 72.

The following software, using NVIDIA's Cg programming language, can be used in accordance with one aspect of the present invention. The scaling factor below is obtained from the code above so that the brightness of the displayed image does not change with the zoom value. In the code below, the scaling is performed on the x and y value such that the x and y values are decreased as a zoom out operation occurs and such that the x and y values are increased as a zoom in operation occurs. Of course, the z component can also be scaled according to the zoom operation (with different code) to achieve the same result.

```
struct v2f {
    float4 position : POSITION;
    float3 TexCoord0 : TEXCOORD0;
    float3 TexCoord1 : TEXCOORD1;
};
half4 main( v2f IN,
        uniform sampler3D Volume,
        uniform sampler1D TransferFunction,
        uniform half3 lightDir,
        uniform half3 halfway,
        uniform half ambientparam,
        uniform half diffuseparam,
        uniform half specularparam,
        uniform half shininessparam,
        uniform half2 scalingFactor
        ) : COLOR
{
    // lookup sample from volume
    half4 sample = h4tex3D(Volume, IN.TexCoord0);
    // classification of sample
    half4 OUT = h4tex1D(TransferFunction, sample.r);
    // compute screen-space derivative (note scaling factor for z)
    half3 gradient = half3(0,0,.04);
    gradient.x = ddx(sample.x);
    gradient.y = ddy(sample.x);
    // optional object-space derivative along z-direction
    // scale screen-space derivatives
    gradient.xy = gradient.xy * scalingFactor;
    gradient.z = tex3D(Volume, IN.TexCoord1 .x
                    –tex3D(Volume, IN.TexCoord0).x;
    // normalize gradient
    gradient = normalize(gradient);
    // compute diffuse and specular components
    half diffuse = abs(dot(lightDir, gradient));
    half specular = pow(abs(dot(halfWay,gradient)), shininessparam);
    // compute output color (ambient + diffuse + specular)
    OUT.rgb = (ambientparam + diffuse * diffuseparam) * 0UT.rgb
                    + specularparam * specular;
    return OUT;
}
```

In this program, the volume is bound to a 3 D sampler (Volume), and the transfer function is bound to a 1D sampler (Transfer function). First, a density value is fetched from the volume texture using the texture coordinates passed in to texture stage 0 (TexCoord0). Then, classification is performed using a dependent texture lookup into the transfer function. Screen-space partial derivatives of the volume density are evaluated using DDX and DDY commands, and scaled based upon the zoom value as previously discussed. An optional object-space partial derivative is evaluated for the z-component using a texture coordinate that is offset by the samping distance along the view-space z-direction (TexCoord1). Then the gradient is normalized and diffuse and specular shading parameters for a Blinn-Phong shading model are computed. Finally, the output color is computed and returned from the fragment program.

To further optimize the fragment code, the diffuse and specular shading coefficients can be pre-computed and stored in a look up table (lookup-texture). The following code illustrates the computation of the look up table for given Blinn-Phong shading parameters (ambientparam, diffuseparam, specularparam, shininessparam), a given light direction (lightDir), a given halfway light direction (halfway) and a lookup table size (lsize).

```
float dot (const float vector1 [3] , const float vector2 [3] )
{
    return vector1[0] * vector2[0] +
```

```
            vector1[1] * vector2[1] +
            vector1[2] * vector2[2] ;
}
void normalize (float vector [3] )
{
    float1 = sqrt (vector[0] * vector[0] +
                vector[1] * vector[1] +
                vector[2] * vector[2] ) ;
    vector [0] = vector[0] / 1;
    vector [1] = vector[1] / 1;
    vector [2] = vector[2] / 1;
}
void computeLightMapTable(const float ambientparam,
                    const float diffuseparam,
                    const float specularparam,
                    const float shininessparam,
                    const float lightDir [3] ,
                    const float halfway [3] ,
                    const int lsize,
                    unsigned char* buffer)
{
    float gradient [3] ;
    int pos = 0;
    for (int y=0; y<lsize; y++)
    {
        for (int x=0; x<lsize; x++)
        {
            gradient [0] = x / ( (float) lsize–1) ;
            gradient [1] = y / ( (float) lsize–1) ;
            gradient [2] = .04;
            normalize(gradient);
            buffer[pos*2] = (ambientparam + diffuseparam) *
                    fabs (dot (lightDir, gradient) ) * 255;
                buffer[pos*2+1] = 255 * specularparam *
                pow(fabs(dot(halfWay, gradient) ), shininessparam);
            pos++;
        }
    }
}
```

Although the invention herein has been described with reference to particular embodiments, it is to be understood that these embodiments are merely illustrative of the principles and applications of the present invention. It will be apparent to those skilled in the art that various modifications and variations can be made to the method of the present invention without departing from the spirit and scope of the invention. Thus, it is intended that the present invention include modifications and variations that are within the scope of the appended claims and their equivalents.

The invention claimed is:

1. A shading method for rendering volumetric data having a plurality of pixels, each of the plurality of pixels having a scalar value, comprising:
   direct rendering of the volumetric data, including the steps of:
   determining a partial derivative with respect to the x direction of a first of the plurality of pixels in a screen-space;
   determining a partial derivative with respect to the y direction of the first of the plurality of pixels in the screen-space;
   determining a partial derivative with respect to a z direction of the first of the plurality of pixels in an object-space; and
   determining a gradient based on the partial derivative with respect to the x direction, based on the partial derivative with respect to the y direction and based on the partial derivative with respect to the z direction.

2. The method as claimed in claim 1, further comprising using the gradient to determine a shading characteristic of the first pixel based on the gradient.

3. The method as claimed in claim 1, further comprising:
determining a partial derivative with respect to the x direction of each of the remaining plurality of pixels in the screen-space;
determining a partial derivative with respect to the y direction of each of the remaining plurality of pixels in the screen-space;
determining a partial derivative with respect to the z direction of each of the remaining plurality of pixels in the object-space; and
determining a gradient for each of the remaining plurality of pixels based on the associated partial derivative with respect to the x direction, based on the associated partial derivative with respect to the y direction and based on the associated partial derivative with respect to the z direction.

4. The method as claimed in claim 1, further comprising using the associated gradient to determine a shading characteristic of each of the remaining plurality of pixels.

5. The method as claimed in claim 3, wherein the steps of determining the partial derivatives are performed in a graphics processing unit.

6. The method as claimed in claim 5, wherein the steps of determining a partial derivative with respect to the x direction are performed using a function ddx in the graphics processing unit and the steps of determining a partial derivative with respect to the y direction are performed using a function ddy in the graphics processing unit.

7. The method as claimed in claim 3, wherein the step of determining the partial derivatives is performed using a forward difference.

8. The method as claimed in claim 4, further comprising caching the partial derivatives prior to computing the gradients.

9. The method as claimed in claim 1, further comprising scaling the partial derivative with respect to the x direction and the partial derivative with respect to the y direction in accordance with a zoom factor.

10. The method as claimed in claim 9, wherein the partial derivative with respect to the x direction and the partial derivative with respect to the y direction are scaled up with a zoom in and are scaled down with a zoom out.

11. The method as claimed in claim 1, further comprising scaling the partial derivative with respect to the z direction in accordance with a zoom factor.

12. A system of shading for rendering volumetric data, comprising:
a device for imaging a body part to derive scalar values associated with a plurality of pixels;
a processor that, for each of the plurality of pixels, determines a partial derivative in an x direction in a screen-space, determines a partial derivative in a y direction in the screen-space, determines a partial derivative with respect to a z direction in an object-space and determines a gradient based in part on the partial derivative in the x direction, on the partial derivative in the y direction and on the partial derivative with respect to the z direction in the object-space;
wherein the processor performs direct rendering of volumetric data based in part on the gradient; and
a display that displays the rendered volumetric data.

13. The system as claimed in claim 12, wherein the processor is a graphics processing unit.

14. The system as claimed in claim 13, wherein the graphics processing unit uses a fragment function ddx and a fragment function ddy.

15. The system as claimed in claim 12, further comprising means for caching the partial derivatives prior to computing the gradients.

16. The system as claimed in claim 12, wherein the processor determines a partial derivative in the z direction using samples of data along a viewing direction.

17. The system as claimed in claim 12, wherein the processor determines a partial derivative in the z direction using samples of data in an object-space.

18. The system as claimed in claim 12, wherein the processor scales the partial derivatives in accordance with a zoom factor.

19. A method of rendering volumetric data having a plurality of pixels, comprising:
direct rendering of the volumetric data, including the steps of:
obtaining a sample of data from a volume;
classifying the sample;
computing a gradient for each of the plurality of pixels, the gradient being based at least in part on a partial derivative with respect to an x direction in a screen space, on a partial derivative with respect to a y direction in the screen-space and on a partial derivative with respect to a z direction in an object-space;
normalizing the gradient;
computing diffuse and specular components; and
computing output colors.

20. The method as claimed in claim 19, further comprising displaying the result.

21. The method as claimed in claim 19 wherein the gradient is determined using a partial derivative of each of the plurality of pixels in an x direction in a screen-space and using a partial derivative in a y direction of each of the plurality of pixels in the screen-space.

22. A shading method for rendering volumetric data, the method comprising:
performing direct rendering including the steps of:
selecting a first pixel in screen-space coordinates, the first pixel having a corresponding scalar value obtained from the volumetric data;
determining a difference between the scalar value associated with the first pixel and a scalar value associated with a neighboring pixel in a x direction in screen space;
determining a difference between the scalar value associated with the first pixel and a scalar value associated with a neighboring pixel in a y direction in screen space;
determining a difference between the scalar value associated with the first pixel and a scalar value associated with a neighboring pixel in a z direction in object space;
determining a gradient associated with the first pixel based on the differences; and
using the gradient to compute a shading characteristic of the first pixel.

* * * * *